US011829395B2

(12) United States Patent
Sharma et al.

(10) Patent No.: US 11,829,395 B2
(45) Date of Patent: Nov. 28, 2023

(54) SYSTEM, METHOD, AND NON-TRANSITORY COMPUTER-READABLE STORAGE MEDIA FOR GENERATING SYNONYMS OF A SEARCH QUERY

(71) Applicant: Walmart Apollo, LLC, Bentonville, AR (US)

(72) Inventors: Monadhika Sharma, Santa Clara, CA (US); Andrei Lopatenko, Sunnyvale, CA (US); Seshadri Sridharan, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 445 days.

(21) Appl. No.: 16/457,973

(22) Filed: Jun. 29, 2019

(65) Prior Publication Data

US 2019/0324979 A1 Oct. 24, 2019

Related U.S. Application Data

(63) Continuation of application No. 14/634,657, filed on Feb. 27, 2015, now Pat. No. 10,339,165.

(51) Int. Cl.
*G06F 16/332* (2019.01)
(52) U.S. Cl.
CPC .............................. *G06F 16/3322* (2019.01)
(58) Field of Classification Search
CPC ................................................ G06F 16/3322
See application file for complete search history.

(56) References Cited

U.S. PATENT DOCUMENTS

| | | | | |
|---|---|---|---|---|
| 7,636,714 B1* | 12/2009 | Lamping | ............. | G06F 16/3338 |
| 3,027,990 A1 | 9/2011 | Mysen et al. | | |
| 8,027,990 B1* | 9/2011 | Mysen | ................ | G06F 16/3322 |
| | | | | 707/766 |
| 8,326,826 B1* | 12/2012 | Upstill | ................... | G06F 16/951 |
| | | | | 707/723 |
| 8,725,756 B1* | 5/2014 | Garg | ..................... | G06F 16/248 |
| | | | | 707/767 |
| 8,762,363 B1* | 6/2014 | Koo | ..................... | G06F 16/3325 |
| | | | | 707/706 |
| 8,849,822 B2* | 9/2014 | Guo | ....................... | G06F 16/337 |
| | | | | 707/731 |
| 8,949,227 B2* | 2/2015 | Li | ......................... | G06F 40/247 |
| | | | | 707/723 |
| 9,020,924 B2* | 4/2015 | Wu | ................... | G06F 16/90324 |
| | | | | 706/14 |

(Continued)

*Primary Examiner* — Mark D Featherstone
*Assistant Examiner* — Ranjit P Doraiswamy
(74) *Attorney, Agent, or Firm* — BRYAN CAVE LEIGHTON PAISNER LLP

(57) ABSTRACT

A method including analyzing the query data to formulate one or more groups of synonym candidates, wherein each synonym in the one or more groups of synonym candidates is categorized in one or more synonym candidate categories. Reformulating the first search query by removing at least one synonym candidate from the first group of synonym candidates to form a first set of synonyms such that each synonym in the first set of synonyms is categorized in the synonym candidate category that matches the search query category of the search query, wherein the at least one synonym candidate removed from the first group of synonym candidates is not categorized in the synonym candidate category.

20 Claims, 4 Drawing Sheets

(56) References Cited

U.S. PATENT DOCUMENTS

| | | |
|---|---|---|
| 2009/0070299 A1* | 3/2009 | Parikh .................... G06Q 30/06 |
| 2011/0078127 A1 | 3/2011 | Lin et al. |
| 2012/0066195 A1 | 3/2012 | Lee et al. |
| 2012/0084297 A1* | 4/2012 | Mishne ................ G06F 16/951 707/748 |
| 2012/0166468 A1* | 6/2012 | Gupta ................ G06F 16/9535 707/768 |
| 2012/0226696 A1* | 9/2012 | Thambiratnam ..... G06F 16/951 707/738 |
| 2013/0282702 A1 | 10/2013 | Zhu et al. |
| 2013/0282709 A1 | 10/2013 | Zhu et al. |

\* cited by examiner

SYSTEM, METHOD, AND NON-TRANSITORY COMPUTER-READABLE STORAGE MEDIA FOR GENERATING SYNONYMS OF A SEARCH QUERY

CROSS-REFERENCE TO RELATED APPLICATIONS

This application is a continuation of U.S. application Ser. No. 14/634,657, filed Feb. 27, 2015. U.S. application Ser. No. 14/634,657 is incorporated herein by reference in its entirety.

FIELD OF THE DISCLOSURE

The present disclosure relates generally to a system, method, and non-transitory computer-readable storage media for generating synonyms of a search query.

BACKGROUND

Online shopping is a form of electronic commerce where goods and/or services can be bought, purchased, and/or traded using the Internet. For example, the goods and/or services may be located online by entering a search query into a web search engine, and allowing the search engine to search the Internet for the goods and/or services identified in the search query.

Web search engines typically rely on text matching for locating relevant goods and/or services on the Internet. However, in some instances, multiple users may formulate different search queries when looking for the same good and/or service. For example, a first user may formulate the search query "mattresses" when searching for a mattress, while a second user may formulate the search query "beds" when searching for a mattress. Since the search engine may not recognize the term "beds" as being synonymous with a mattress, the search engine may then recall and/or locate goods and/or services which are irrelevant to a mattress, such as bed frames, bedroom furniture, hotel rooms, etc.

Current methods of generating synonyms for a search query have utilized various out-of-the-box ontology technologies, which are typically formulated to generate synonyms of known products and/or services. However, such ontology technologies may not be able to recognize specific brand names, specific product names, and/or retail-specific jargon. Therefore, the ontology technology alone may not be able to generate most, if not all suitable synonyms for a search query.

Current methods of generating synonyms for a search query may also or alternatively analyze session logs for reformulating search queries. While suitable for head queries, analyzing query logs for query reformulation alone may not be as effective for generating usable synonyms for tail queries which may be due, at least in part, to lower online traffic and less available information for query reformulation.

The present disclosure is aimed at solving the problems identified above.

BRIEF DESCRIPTION OF THE DRAWINGS

Advantages of the present disclosure will be readily appreciated, as the same becomes better understood by reference to the following detailed description, when considered in connection with the accompanying drawings. Non-limiting and non-exhaustive embodiments of the present disclosure are described with reference to the following figures, wherein like numerals refer to like parts throughout the various views unless otherwise specified.

DETAILED DESCRIPTION

Figure 1:
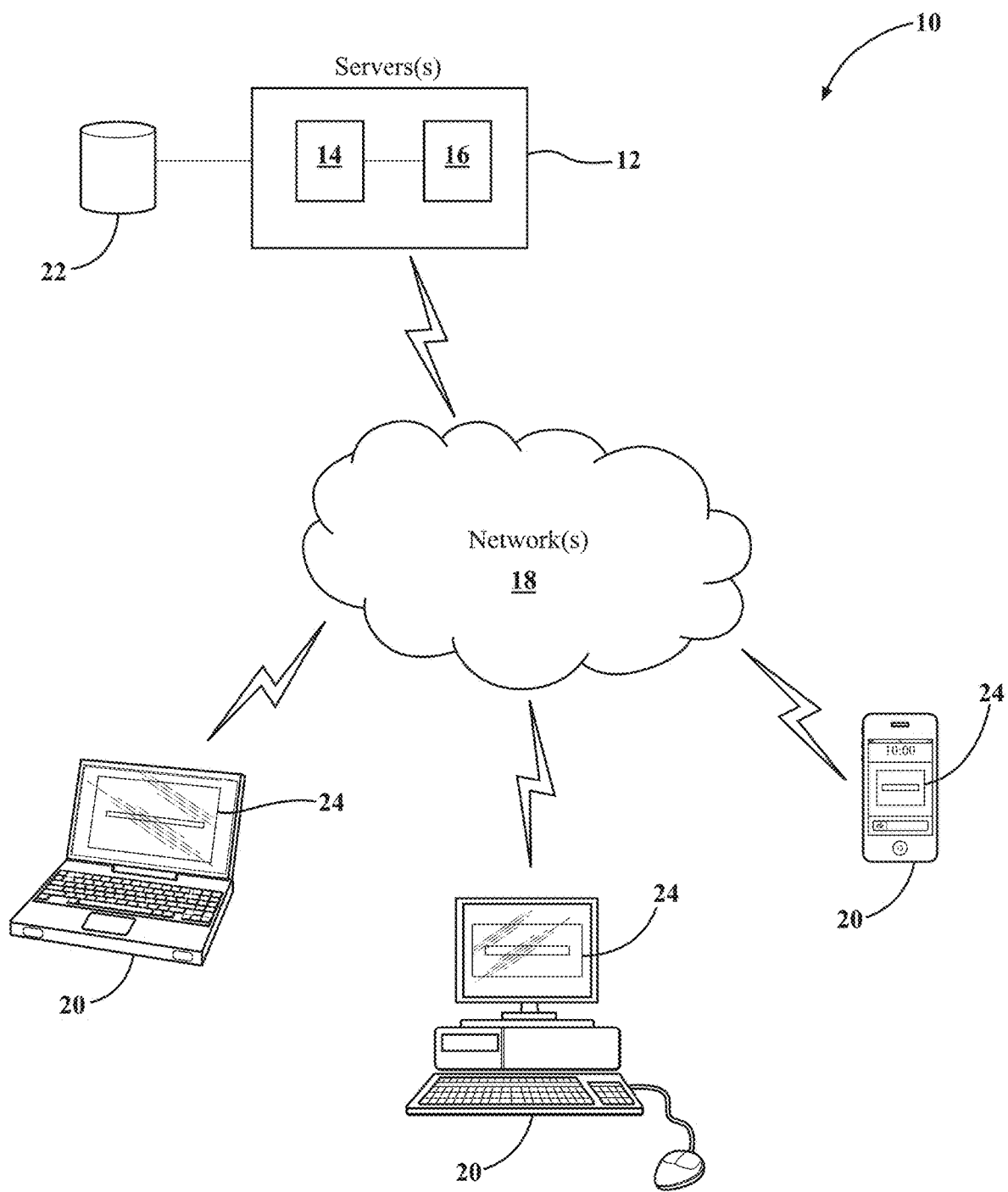
FIG. 1 is a schematic illustrating an example of a system for generating synonyms of a search query.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment of example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments and/or examples in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system". Furthermore, the present invention may take the form of a computer program product embodied in any tangible media or expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisional via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagram(s) in the flow diagram(s) illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with" or "configured to be in communication with". This terminology is intended to be non-limiting, and where appropriate, be interpreted to include without limitation, wired and wireless communication using any one or a plurality of suitable protocols, as well as communication methods that are constantly maintained, are made on a periodic basis, and/or made or initiated on an as needed basis.

The present disclosure particularly describes how to generate an accurate and usable set of synonyms of a search query entered into a web search engine, where each synonym of the set of synonyms can be used by the web search engine to accurately find, locate, and/or recall relevant goods, services, and/or topics/points of interest. More particularly, the present disclosure describes utilizing a session log reformulation process for generating a plurality of groups of synonym candidates, selecting one of the groups of synonym candidates based on the search query, and filtering the selected group of synonym candidates to narrow the selected group of synonym candidates into a useful and accurate set of synonyms of the search query. Accordingly, the system, method, and non-transitory computer-readable storage media of the present disclosure transforms query data into a relevant, accurate, and useful set of synonyms of a search query (i.e., a search query that a user is presently utilizing in a web search) entered into a web search browser.

With reference to the figures and in operation, the present disclosure provides a system 10, a method, and one or more non-transitory computer-readable media for generating synonyms of a search query entered into a web search engine.

An example of a system 10 which is usable for generating synonyms of a search query is shown in FIG. 1. The system 10 includes at least one server 12 with a processor 14 and a memory 16 operatively associated and in communication with the processor 14. The processor 14 may be a controller, a microcontroller, a microprocessor, an application specific integrated circuit (ASIC), or a processor working in conjunction with a central processing unit (CPU) performing the function of a general purpose computer. The processor 14 is configured to execute computer programs containing computer-readable and executable instructions for performing one or more steps of the method for generating synonyms of a search query. In an example, the processor 14 is configured to execute a computer program containing computer-readable and executable instructions for performing all of the steps of a method for generating synonyms of a search query. The memory 16 may include a read only memory (ROM) and random access memory (RAM) for storing the computer-readable instructions for performing the step(s) of the method.

The system 10 further includes one or more communication network(s) 18 that enable communication between the server(s) 12 and one or more computing devices 20. In an example, the computing device 20 includes any suitable device that enables a user to access and communicate with the system 10. The computing device 20 also includes any suitable device that enables the user to access the Internet and to perform desired web-based searching utilizing, for example, a web search engine. Typically, the user accessing a webpage 24 associated with the web search engine, and enters his/her search query into a search or text box set forth on the webpage 24. Non-limiting examples of computing devices 20 include a laptop or notebook computer, a desktop computer, a tablet computer, a personal data assistant (PDA), an Internet-enabled mobile telephone (such as a smartphone), a hand-held mobile device such as a cellular phone, and/or the like.

The communication network(s) 18 may be used to establish any wired and/or wireless connections. Non-limiting examples of communication network(s) 18 include the Internet, a file transfer protocol (FTP), an Intranet, a local area network (LAN), a virtual private network (VPN), a cellular network, and a wide area network (WAN). The various communication networks 18 may be used alone or in conjunction with one another.

As shown in FIG. 1, the system 10 further includes a database 22 coupled to the server(s) 12 and in operative and selective communication with the processor 14. In an example, the processor 14 collects data, such as query data of a web searching or query session, and organizes the query data into appropriate a session log. The session log (containing the respective query data) is stored in the database 22. Further details of the query data, query session, and session log are set forth below.

Figure 2:
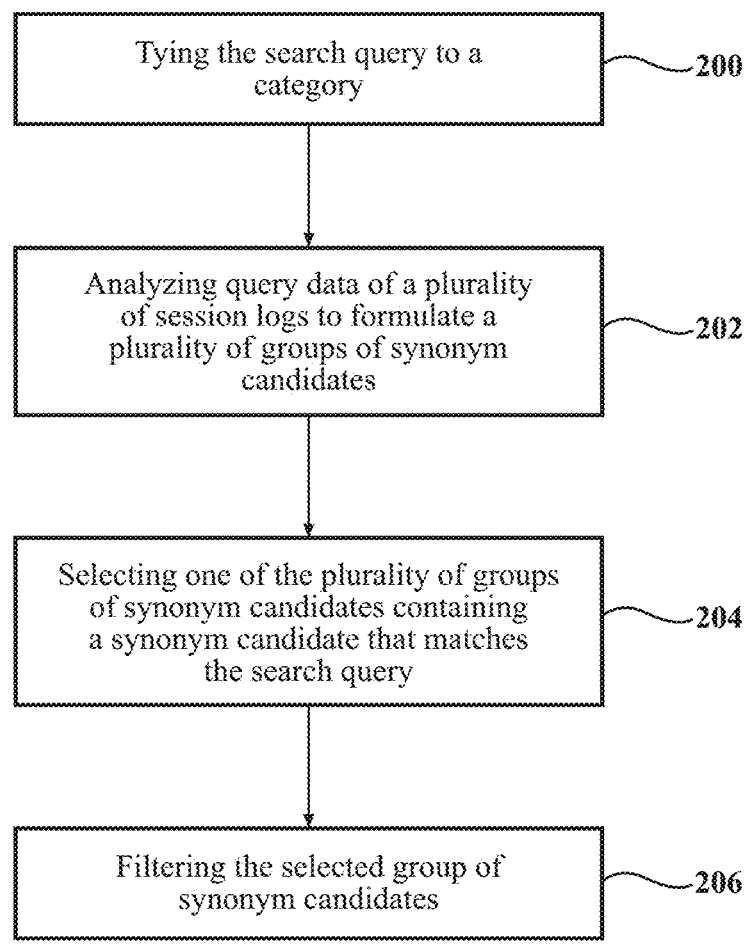
FIG. 2 is a flowchart of an example of a method for generating synonyms of a search query.

Examples of a method for generating synonyms of a search query are described below with reference to FIGS. 2-4. As shown in FIG. 2, the method generally includes tying the search query to a category (as shown in method step 200), analyzing query data of a plurality of session logs to formulate a plurality of groups of synonym candidates (as shown in method step 202), selecting one of the plurality of groups of synonym candidates containing a synonym candidate that matches the search query (as shown in method step 204), and filtering the selected group of synonym candidates (as shown in method step 206).

A specific example of the method is described below with reference to FIGS. 3-4. It is to be understood that the method described blow with reference to FIGS. 3-4 includes a plurality of steps, which may be performed independently of, or in combination with other steps of the method. Furthermore, the steps of the method may be performed by one or a combination of components of the system 10.

At the outset, a session is typically initiated when a user accesses the webpage 24 of the web search engine on the Internet (utilizing, e.g., the computing device 20 which is accessible to the Internet through one or more of the communication network(s) 18), and enters a search query into the web search engine. Typically, the search query includes one or more terms, which is/are entered as text into a search box on the webpage 24 of the web search engine. The search query generally describes or intends to describe a particular item, such as a good and/or service. In some instances, the search query describes or intends to describe a topic and/or a point of interest for purposes of obtaining information pertaining to the topic of interest and/or the point of interest. For example, a search query may include the term "beds" describing or intending to describe bed frames. In another example, the search query may include the terms "dog grooming supplies" to describe or intend to describe grooming supplies for dogs. In yet another example, the search query may include the terms "northern Michigan" to describe or intend to describe the upper peninsula of Michigan as a point of interest.

A session typically remains active for so long as there is interaction between the user and the web search engine. For example, the session may remain active for so long as the user is actively searching for a particular good, a particular service, and/or a particular topic or point of interest, such as by entering new or reformulated search queries into the web search engine, scrolling through results of a search based on a particular search query, selecting to view a webpage associated with one or more of the search results based on the search query, and/or the like. The session may remain active, for example, for a predetermined amount of time (such as for 15 minutes, 25 minutes, 1 hour, etc.) after the interaction between the user and the web search engine stops. For instance, the session may end 15 minutes after the user entered his/her last search query into the web search engine. The session may also end after the user closes and/or leaves the webpage 24 of the web search engine, such as by accessing another webpage or closing his/her Internet browser.

A new session may be initiated after the previous session has ended. This may occur, for example, by entering a new search query into the web search engine after the previous session has lapsed. A new session may also be initiated upon accessing the webpage 24 of the web search engine after the user previously left the webpage and/or closed his/her Internet browser. The new session may remain active for so long as there is interaction between the user and the web search engine, as described in detail above.

Figure 3:
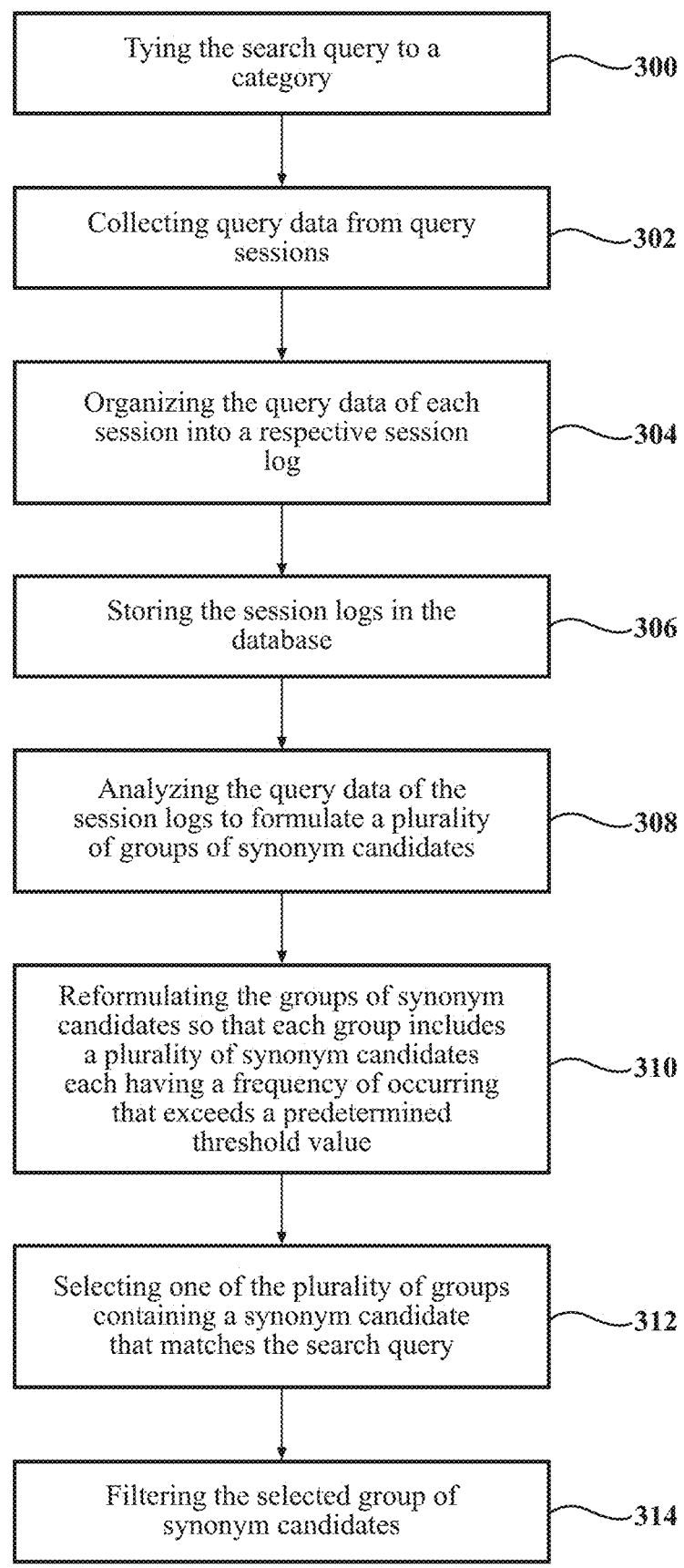
FIG. 3 is a flowchart of another example of a method for generating synonyms of a search query.
Figure 4:
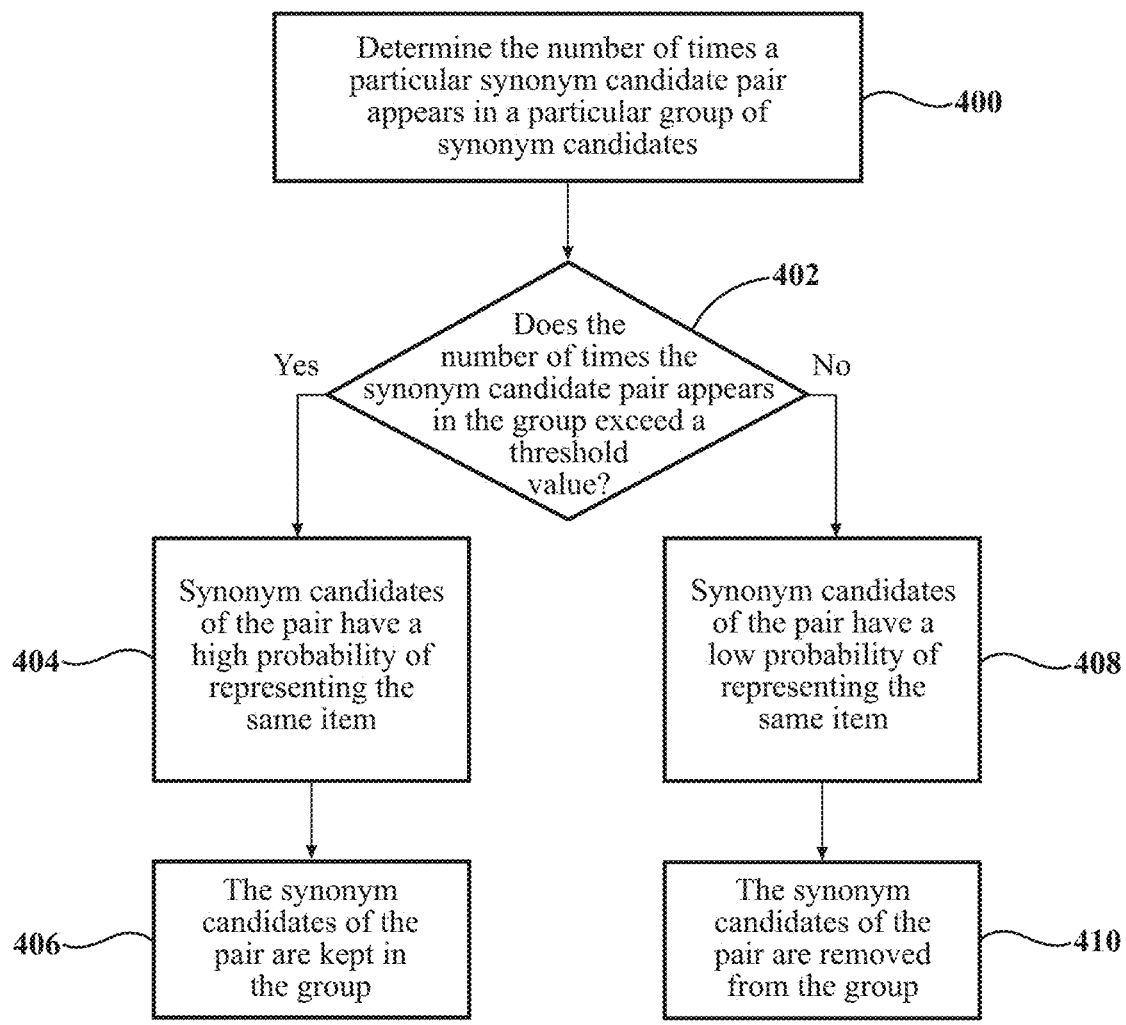
FIG. 4 is a flowchart of an example of a sub-process of the method of FIG. 3.

As shown in FIG. 3, the method includes tying the search query to a category (as shown in method step 300). The category/ies tied to the search query generally include a single category (e.g., "Women's clothing") or a set of categories (e.g., a general category and one or more subcategories, such as "Women's clothing/women's shirts"). Since each product, service, and/or topic/point of interest available on the Internet is linked to a particular category path, the processor 14 may, in an example, automatically retrieve the category of the search query as soon as the user selects an icon and/or hyperlink associated with the product, service, and/or topic/point of interest.

The method further includes collecting query data of each of the plurality of session logs from a corresponding session (as shown in method step 302). In an example, the query data for each session may be collected by the processor 14 from the web search engine in real time, such as while the user is performing his/her search utilizing the web search engine. Alternatively, the query data for each session may be collected by the processor 14 periodically. For example, the processor 14 may collect the query data at the end of a predetermined time interval (such as at the end of every 1 minute, every 5 minutes, etc.). In another example, the processor 14 may collect the query data in response to a trigger (such as upon detecting when the session ends, detecting when the user closes his/her Internet browser, etc.).

The method further includes organizing the collected query data into the plurality of session logs (as shown in method step 304) and storing the session logs in the database 22 (as shown in method step 306). In an example, the processor 14 organizes the query data by separating the query data collected from the web search engine into their corresponding sessions. Once separated, the query data for each session is stored in a session log in the database 22. It is to be understood that a particular session log includes the query data from its corresponding session. Further, since the session cannot be reopened, the session logs stored in the database 22 are not updated. Typically, session logs are maintained in the database 22 for a preset amount of time, such as for 6 months, 1 year, etc. After the preset amount of time lapses, the session log may be removed and/or deleted from the database 22.

It is further to be understood that the processor 14 continuously collects query data for each session utilizing the web search engine. To this end, the processor 14 also continuously organizes the query data into a respective session log and stores the session logs in the database 12. Accordingly, the database 22 is dynamically updated with new session logs. Furthermore, older session logs are dynamically removed from the database 22 after the preset amount of time lapsed, as mentioned above.

Typically, a single session log may be created for each session, and the session log includes the query data collected while the session was active. The query data may include search query/ies that was/were entered into the web search engine while the session was active. The query data may also include user feedback data, such as an identification of the goods, services, and/or topics/points of interest which were the included in the search results and viewed by the user. In an example, the user may view the goods, services, and/or topics/points of interest by accessing one or more webpages associated with the goods, services, and/or topics/points of interest, such as by selecting (e.g., by a mouse click) one or more icons and/or hyperlinks displayed on the web search engine results page that connect or link to the webpage(s) associated with the goods, services, and/or topics/points of interest.

As shown in FIG. 3, the method further includes analyzing the query data of the session logs to formulate a plurality of groups of synonym candidates (as shown in method step 308). For example, the processor 14 analyzes the query data of each of the session logs stored in the database 22, and identifies one or more synonym candidate pairs in each session log. As the name denotes, a synonym candidate pair is a pair of synonym candidates made up of first and second search queries used during a session, where the first search query was changed to the second search query during the session. In an example, during a session, the user enters a first search query into the web search engine and performs a first search, and afterwards enters a second query into the web search engine and performs a second search. The first and second queries are paired together and form a synonym candidate pair.

The synonym candidate pair (i.e., the first and second search queries described above) is dropped or placed by the processor 14 into a first corresponding group of synonym candidates which is stored in the database 22. Additional synonym candidate pairs are added to the first group of synonym candidates each time the processor 14, during the analyzing step 306, comes across a synonym candidate pair having at least one of the search queries being the same as at least one of the synonym candidates present in the first group of synonym candidates. For example, the first group of synonym candidates may include "blue shoes" and "blue boots" as synonym candidates and the processor 14 may identify another synonym candidate pair being "blue boots" and "blue rubber uglies". Since "blue boots" is already present in the first group of synonyms, the processor 14 drops the candidate pair "blue boots" and "blue rubber uglies" into the first group of synonym candidates. In another example, the processor 14 may identify another synonym candidate pair being "red shirts" and "red boots". In this scenario, since neither "red shirts" nor "red boots" is already present in the first group of synonym candidates, the processor 14 drops the synonym candidate pair "red shirts" and "red boots" into a second group of synonym candidates.

As another example, from the query data, the processor 14 determines that the search queries "brushes", "hair supplies," "beauty equipment", and "hair products" were used during the session associated with the first session log. Also from the query data, the processor 14 determines that the search query "brushes" was changed to the search query "hair supplies" during the session associated with the first session log. Accordingly, "brushes" and "hair supplies" form a synonym candidate pair. From the query data of a second session log, the processor 14 determines that the search queries "combs", "brushes", and "hair supplies" were used during the session associated with the second session log. Also from the query data, the processor 14 determines that the search query "brushes" was changed to the search query "hair supplies" during the session associated with the second session log. Utilizing this data, the processor 14 drops the pair "brushes" and "hair supplies" into one of the groups. In another example, the processor 14 analyzes the query data and finds that the term "hair supplies" was changed to the term "beauty equipment." In this example, the processor 14 drops the pair "hair supplies" and "beauty equipment" into the same group, because "hair supplies" was already present in that group.

It is to be understood that the processor 14 determines every query change or reformulation that occurred during a respective session of the session logs. Further, each session may have a number of different query changes. For example, one session may have a first query change where the search query "brushes" was changed to the search query "hair supplies" and a second query change where the search query "hair supplies" was changed to the search query "beauty equipment".

It is further to be understood that in instances where the online traffic of the web search engine is high, the processor 14 analyzes a large number of session logs and, as a result, will likely identify many (e.g., hundreds or thousands of) candidate pairs. Furthermore, since there are various products, services, and/or topics/points of interest which are available to the users, many (e.g., hundreds or thousands of) different search queries may be entered into the web search engine by the users. Accordingly, many (e.g., hundreds or thousands of) groups of synonym candidates may be created by the process described above.

In an example, one or more of the groups of synonym candidates may have redundant, meaningless, and/or irrelevant synonym candidates, and such candidates may be considered to be noise. To remove the noise, the method includes reformulating the groups of synonym candidates so that each group includes a plurality of synonym candidates that have a frequency of occurring exceeding a predetermined threshold value (as shown in method step 310 in FIG. 3). With reference now to FIG. 4, the processor 14 determines the number of times a particular synonym candidate pair appears in a particular group of synonym candidates (as shown in method step 400 in FIG. 4). Said differently, the processor 14 determines the frequency of a particular query change made by users of the web search engine. The number of times the synonym candidate pair appears in the group is compared to a predetermined threshold value (as shown in method step 402). The predetermined threshold value is a preset value, and is typically set based on the item (e.g., the product, service, and/or topic/point of interest) pertaining to the search queries of the synonym candidate pair. Typically, for web search engines having higher traffic, the predetermined threshold value may be set to a high value (such as, e.g., 50). For web search engines having lower traffic, the predetermined threshold value may be set to a low value (such as, e.g., 5). It is to be understood that the predetermined threshold value may be changed depending, at least in part, on the amount of traffic the search engine has and/or the type of item that is being searched.

In instances where the number of synonym candidate pairs in a particular group exceeds the predetermined threshold value, the synonym candidate pair is considered to have a high probability of representing the same item (e.g., the same good, service, and/or topic/point of interest) (as shown in method step 404). For example, if the threshold value is five and the synonym candidate appears six times in the group, then the synonym candidate pair is considered to frequency occur and therefore, the synonym candidates of the pair are likely to be used to find the same item. In this scenario, the synonym candidates of the pair are kept in the group of synonym candidates (as shown in method step 406). Alternatively, where the number of synonym candidate pairs of the group does not exceed the predetermined threshold value, the synonym candidate pair is considered to have a low probability of representing the same item (as shown in method step 408). For example, if the threshold value is five and the synonym candidate appears three times in the group, then the synonym candidate pair is considered to not frequency occur (i.e., considered to be infrequent) and therefore, the synonym candidates of the pair are not likely to be used to find the same item. In this scenario, the synonym candidates of the pair are removed from the group of synonym candidates (as shown in method step 410).

Referring back to FIG. 3, the method further includes selecting one of the plurality of groups of synonym candidates containing a synonym candidate which matches the search query (as shown in method step 312). Once a group has been selected, the method further includes filtering the selected group of synonym candidates (as shown in method step 314). While the selected group of synonym candidates includes set of synonym candidates which are relevant to the present search query, the selected group of synonym candidates still typically contains a significant amount of noise.

During the filtering step 314, and in an example, the method includes weeding out or removing at least one synonym candidate from the selected group of synonym candidates by removing the synonym candidate(s) from the selected group of synonym candidates that have a spelling error. For example, a synonym candidate that may be weeded out from the selected group of synonym candidates include candidates that are spelled incorrectly, e.g., the query "wms" instead of "women's" or the query "tickt" instead of the query "ticket". The misspelled query/ies are weeded out, and therefore removed from the selected group of synonym candidates.

The step of weeding out or removing at least one synonym candidate from the selected group further includes, for example, removing the synonym candidate(s) that qualifies as a stemming query of another synonym candidate of the selected group of synonym candidates. For example, synonym candidate(s) that qualify/ies as a stemming query is a query that is the same as another one of the synonym candidates but is represented by a different spelling or acronym, or is a plural or singular of the other synonym candidate. Examples of stemming queries include the queries "chair" and "chairs", the queries "High Density Television" and "Hi-Def TV", and the queries "HDTV" and "HD-TV". Since the stemming query is not different from the other synonym candidate, the stemming query (i.e., the candidate synonym) is weeded out and removed from the selected group of synonym candidates.

The step of weeding out or removing at least one candidate further includes removing synonym candidate(s) that qualifies as a corner query; e.g., a query that is empty. Examples of empty queries include those that contain a plurality of spaces, various characters or symbols, or random numbers, letters, and/or symbols that have no or very little meaning. Corner queries may also include queries that have empty category information.

The step of weeding out or removing at least one synonym candidate further includes removing the synonym candidate (s) that is not mutually exclusive from another synonym candidate. Said differently, synonym candidate(s) may be removed from the selected group of synonym candidates that is mutually non-exclusive from another synonym candidate of the selected group of synonym candidates. For example, the query "red shirt" is not mutually exclusive from the query "shirts that are red", and therefore the synonym candidate "red shirt" would be weeded out from the selected group of synonym candidates. In another example, the query "red shirt" is mutually exclusive from the query "shirt for boys", and therefore the synonym candidate "red shirt" would remain in the selected group of synonym candidates.

The step of weeding out or removing at least one synonym candidate further includes removing synonym candidate(s) having the same number of words as another candidate, but having an edit distance that is three or more words. Said differently, synonym candidate(s) may be removed from the selected group of synonym candidates that has an edit distance of three or more words from another synonym candidate of the selected group of synonym candidates. However, the candidate having the same number of words as another candidate, but having an edit distance of two or less words would remain in the selected group of synonym candidates. For example, the query "girl dress" and the query "party dress" have an edit distance of three or more words, and therefore the query "girl dress" would remain in the selected group of synonym candidates. In another example, the query "chair" and the query "chairs" has an edit distance of two or less words, and therefore the query "chair" would be removed from the selected group of synonym candidates.

Also during the filtering step 314, the method includes tying each synonym candidate of the selected group of synonym candidates to a category. In an example, the processor 14 ties each synonym candidate of the selected group of synonym candidates to a category to form a query-category pair for each synonym candidate. The category/ies tied to a synonym candidate generally includes a category or set of categories (e.g., a general category and one or more subcategories) that the users tend to engage the most during a web search using a given query (i.e., the synonym candidate). For example, each product, service, and/or topic/point of interest available on the Internet is linked to a particular category path. Accordingly, each time the user selects an icon and/or hyperlink associated with the product, service, and/or topic/point of interest, the specific category path associated with product, service, and/or topic/point of interest is collected by the processor 14 and is stored in the database 22. In an example, each synonym candidate of the selected group of synonym candidates is tied to a single category. In another example, each synonym candidate of the selected group of synonym candidates is tied to at least one category. In the later example, the synonym candidate may be tied to a general category or may be tied to a general category and one or more subcategories. For example, the synonym candidate may be tied to "clothing" as a general category and "Women's clothing" as a subcategory.

In an example, the category or set of categories for each synonym candidate may be determined by collecting category data during a session, and determining the number of times an item is selected with the same category. Said differently, the processor 14 determines the frequency of an item selected by the user that has a category that is common with the category of the search query. The number of times that an item is selected with the same category is compared to a predetermined threshold value. In an example, the predetermined threshold value is about 90%; i.e., about 90% of the time users are selecting the item tied to the same category. It is to be understood, however, that the predetermined threshold value may be any value as desired.

Once the synonym candidates of the selected group are tied to a category, during the filtering step 314, the method further includes comparing the category of the search query with the category of each of the synonym candidates of the selected group of synonym candidates. In instances where candidates were weeded out from the selected group of synonym candidates, the comparing step includes comparing the category of the search query with the category of each of the synonym candidates remaining in the selected group of synonym candidates after the weeding step is finished. The method further includes removing at least one synonym candidate from the selected group of synonym candidates to form a set of synonyms with each synonym being tied to a category that is common with the category of the search query. The set of synonyms is a final set or group of synonyms may be used to accurately recall desired products, services, and/or topic/point of interest during a web search utilizing the present search query.

In an example, the synonym candidates of the selected group of synonym candidates may be filtered to remove one or more candidates associated with a category or category set which is not common with (e.g., does not match) the category or category set of the present search query. For example, the processor 14 compares the category or category set of the query search with the category or category set of each of the synonym candidates of the selected group of synonym candidates. For instance, for a search query "red shirts", the category tied to the search query may be "shirts". The category "shirts" may then be compared to the category tied to each of the synonym candidates of the selected group of synonym candidates. In an example, one or more of the synonym candidates are tied to the category "shirts". In this example, the category score for the synonym candidate tied to the category "shirts" would be 1/1, while the remaining synonym candidates tied to a category other than "shirts" would have a category score of 0/1. Accordingly, the synonym categories having a category score of 1/1 would be included in the final set of synonyms, while the synonym candidates having a category score of 0/1 would be excluded from the final set of synonyms.

In instances where the search query has a set of categories, the synonym candidates of that have a category which matches one of the categories of the search query receives a high category score. For example, for a search query which has the category set "shirts/women's shirts/women's T-shirts", a synonym candidate having a category set "shirts/women's shirts/women's T-shirts" would have a category score of 3/3 and would then be included in the final set of synonyms. However, a synonym candidate having a category set "shirts/women's shirts/women's blouses" would have a category score of 2/3 and would be excluded from the final set of synonyms. In another example, for a search query which has the category set "clothing/women's clothing/women's shirts/women's T-shirts", a synonym candidate having a category set "clothing/women's clothing/women's shirts/women's T-shirts" would have a category score of 4/4 and would then be included in the final set of synonyms. However, a synonym candidate having a category set "clothing/women's clothing/women's pants/women's dress pants" would have a category score of 2/4 and would be excluded from the final set of synonyms.

Typically, synonym candidates having a category score of at least 75% (i.e., 3/4) would remain in the selected group of synonym candidates. In instances where the category set includes a general category and two sub-categories (i.e., three total categories), a category score of 66% (i.e., 2/3) would be excluded from the selected group of synonym candidates. It is to be understood, however, that the threshold for the category score may be adjusted so that a category score of 2/3 would be acceptable and the synonym category would remain in the selected group of synonym candidates.

Accordingly, all of the synonym candidates of the selected group of synonym candidates remaining after the filtering step 314 become part of a final set of accurate and usable synonyms for the present search query (i.e., the search query that is presently be entered into the web search engine by the user).

A number of embodiments include a system. The system can include one or more processors and one or more non-transitory computer-readable media storing computing instructions configured to run on the one or more processors and perform certain acts. The acts can include storing one or more session logs including query data from search queries received from users of the system, wherein the query data comprises feedback from the users regarding results received by the users from the system in response to the search queries. The acts further can include analyzing the query data to formulate one or more groups of synonym candidates, wherein each synonym in the one or more groups of synonym candidates is categorized in one or more synonym candidate categories. Additionally, the acts can include receiving a first search query from a user interface of an electronic device of a user during a session. The acts can include categorizing the first search query into a search query category and selecting a first group of synonym candidates from the one or more groups of synonym candidates, wherein the first group of synonym candidates has one or more synonyms with at least a synonym candidate category of the one or more synonym candidate categories that matches the search query category of the first search query. The acts can also include reformulating the first search query by removing at least one synonym candidate from the first group of synonym candidates to form a first set of synonyms such that each synonym in the first set of synonyms is categorized in the synonym candidate category that matches the search query category of the search query, wherein the at least one synonym candidate removed from the first group of synonym candidates is not categorized in the synonym candidate category. Further the acts can include submitting to a search engine the first set of synonyms matching the first search query and in response to receiving the first search query and further in response to submitting the search engine the first set of synonyms, transmitting search results of the search engine to the user interface of the electronic device of the user.

Various embodiments include a method. The method can include being implemented via execution of computer instructions configured to run at one or more processors and configured to be stored at one or more non-transitory memory storage devices. The method further can include storing one or more session logs including query data from search queries received from users of the system, wherein the query data comprises feedback from the users regarding results received by the users from the system in response to the search queries. Further, the method further can include analyzing the query data to formulate one or more groups of synonym candidates, wherein each synonym in the one or more groups of synonym candidates is categorized in one or more synonym candidate categories. Additionally, the method can include receiving a first search query from a user interface of an electronic device of a user during a session. The method can also include categorizing the first search query into a search query category and selecting a first group of synonym candidates from the one or more groups of synonym candidates, wherein the first group of synonym candidates has one or more synonyms with at least a synonym candidate category of the one or more synonym candidate categories that matches the search query category of the first search query. The method further can include reformulating the first search query by removing at least one synonym candidate from the first group of synonym candidates to form a first set of synonyms such that each synonym in the first set of synonyms is categorized in the synonym candidate category that matches the search query category of the search query, wherein the at least one synonym candidate removed from the first group of synonym candidates is not categorized in the synonym candidate category. Also, the method can include submitting to a search engine the first set of synonyms matching the first search query and in response to receiving the first search query and further in response to submitting the search engine the first set of synonyms, transmitting search results of the search engine to the user interface of the electronic device of the user.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system comprising:
one or more processors; and
one or more non-transitory computer-readable media storing computing instructions that, when executed on the one or more processors, cause the one or more processors to perform operations comprising:
automatically initiating a collection of query data, wherein the automatically initiating the collection is triggered by detection of a user conducting an internet search of a webpage while a session remains active;
storing one or more session logs including the query data from search queries received from users of the system, wherein the query data comprises feedback data from the users regarding search results received by the users from the system in response to the search queries, and wherein the feedback data further comprises points of interest within the search results viewed by the user;
analyzing the query data to formulate one or more groups of synonym candidates, wherein each synonym in the one or more groups of synonym candidates is categorized in one or more synonym candidate categories;
determining a respective frequency for each query change of the search queries made by the users of a search engine;
reformulating each group of the one or more groups of synonym candidates so that each group comprises a plurality of respective synonym candidates that exceed a respective predetermined frequency threshold value;
receiving a first search query from a user interface of an electronic device of the user during the session;
tying the first search query to a search query category;
selecting a first group of synonym candidates from the one or more groups of synonym candidates that matches the search query category of the first search query, wherein the first group of synonym candidates has one or more synonyms with at least a synonym candidate category of the one or more synonym candidate categories;
reformulating the first search query by removing at least one synonym candidate from the first group of synonym candidates to form a first set of synonyms such that each synonym in the first set of synonyms is tied to a synonym candidate category that matches the search query category of the first search query, wherein the at least one synonym candidate removed from the first group of synonym candidates is not tied to the synonym candidate category, and wherein reformulating the first search query comprises:
dynamically updating the one or more session logs by removing each session log from a database after a preset amount of time;
analyzing the query data of a session log of a plurality of session logs to formulate a plurality of groups of synonym candidates; and
identifying one or more synonym candidates from the plurality of groups of synonym candidates based on at least the search engine performing a first search based on the first search query and the search engine performing a second search based on a second search query within a single session of the plurality of session logs, wherein the first search query was changed to form the second search query during the single session from the plurality of session logs, wherein the first search query and the second search query comprise the feedback data, and wherein the first search query and the second search query are configured to form a synonym candidate pair;
submitting to the search engine the first set of synonyms matching the first search query; and
in response to receiving the first search query and further in response to submitting to the search engine the first set of synonyms, transmitting search results of the search engine to the user interface of the electronic device of the user.

2. The system of claim 1, wherein the computing instructions, when executed on the one or more processors, further cause the one or more processors to perform an operation comprising:
while the session remains active, detecting a second interaction between the user and the search engine for a predetermined amount of time after a first interaction between the user and the search engine stops.

3. The system of claim 1, wherein reformulating the first search query further comprises:
searching the one or more session logs for search terms in the query data that match the first search query; and
tying the first search query to the search query category, wherein the search query category comprises a product, a service, or the points of interest linked to a particular category path of one or more category paths collected by the one or more processors and stored in the database, wherein the one or more category paths are tied to internet links.

4. The system of claim 1, wherein the computing instructions, when executed on the one or more processors, further cause the one or more processors to perform operations comprising:
determining a number of times the synonym candidate pair appears in a group of synonym candidates of the one or more groups of synonym candidates;
when the number of times a particular synonym candidate pair appears in the group of synonym candidates is determined to exceed a predetermined threshold, retaining the particular synonym candidate pair in the group of synonym candidates; or
when the number of times the particular synonym candidate pair appears in the group of synonym candidates is determined to fall below the predetermined threshold, removing the particular synonym candidate pair from the group of synonym candidates.

5. The system of claim 1, wherein the computing instructions, when executed on the one or more processors, further cause the one or more processors to perform an operation comprising:
filtering a particular group of synonym candidates of the one or more groups of synonym candidates by:
tying each synonym candidate of the particular group of synonym candidates to a respective synonym candidate category;
comparing the search query category of a search query with the respective synonym candidate category of each synonym candidate of the particular group of synonym candidates; and
removing the synonym candidate from the particular group of synonym candidates to form the first set of synonyms with each synonym in the first set of synonyms being tied to a set category that is common with the search query category of the search query.

6. The system of claim 1, wherein automatically initiating the collection of the query data further comprises:
collecting the query data of each session log of the one or more session logs;
collecting the query data at a predetermined time interval;
collecting the query data in response to a trigger event, wherein the trigger event comprises at least one of:
detecting when each session of the one or more session logs by the user ends; or
detecting when the user closes an internet browser; and
organizing the query data of each session log of the one or more session logs into the one or more session logs.

7. The system of claim 1, wherein the computing instructions, when executed on the one or more processors, further cause the one or more processors to perform an operation comprising:
determining each query change of one or more query changes that occurred during a respective session of the one or more session logs.

8. The system of claim 1, wherein the computing instructions, when executed on the one or more processors, further cause the one or more processors to perform an operation comprising:
filtering a particular group of synonym candidates of the one or more groups of synonym candidates by:
collecting data about the search query category during the session; and
determining a frequency of an item being selected having the synonym candidate category that is common with the search query category of a respective search query.

9. The system of claim 1, wherein the computing instructions, when executed on the one or more processors, further cause the one or more processors to perform an operation comprising:
filtering a particular group of synonym candidates of the one or more groups of synonym candidates by at least one of:
removing the at least one synonym candidate from the particular group of synonym candidates that has a spelling error; or
removing the at least one synonym candidate from the particular group of synonym candidates that qualifies as a stemming query of another synonym candidate of the particular group of synonym candidates; or
removing the at least one synonym candidate from the particular group of synonym candidates that qualifies as a corner query.

10. The system of claim 1, wherein the computing instructions, when executed on the one or more processors, further cause the one or more processors to perform an operation comprising:
filtering a particular group of synonym candidates of the one or more groups of synonym candidates by at least one of:
removing the at least one synonym candidate from the particular group of synonym candidates that is mutually non-exclusive from another synonym candidate of the particular group of synonym candidates; or
removing the at least one synonym candidate from the particular group of synonym candidates that has an edit distance of three or more characters or letters from another synonym candidate of the particular group of synonym candidates.

11. A method being implemented via execution of computing instructions configured to run at one or more processors and stored at one or more non-transitory computer-readable media, the method comprising:
automatically initiating a collection of query data, wherein the automatically initiating the collection is triggered by detection of a user conducting an internet search of a webpage while a session remains active;
storing one or more session logs including the query data from search queries received from users of a system, wherein the query data comprises feedback data from the users regarding search results received by the users from the system in response to the search queries, and wherein the feedback data further comprises points of interest within the search results viewed by the user;
analyzing the query data to formulate one or more groups of synonym candidates, wherein each synonym in the one or more groups of synonym candidates is categorized in one or more synonym candidate categories;
determining a respective frequency for each query change of the search queries made by the users of a search engine;
reformulating each group of the one or more groups of synonym candidates so that each group comprises a plurality of respective synonym candidates that exceed a respective predetermined frequency threshold value;
receiving a first search query from a user interface of an electronic device of the user during the session;
tying the first search query to a search query category;
selecting a first group of synonym candidates from the one or more groups of synonym candidates that matches the search query category of the first search query, wherein the first group of synonym candidates has one or more synonyms with at least a synonym candidate category of the one or more synonym candidate categories;
reformulating the first search query by removing at least one synonym candidate from the first group of synonym candidates to form a first set of synonyms such that each synonym in the first set of synonyms is tied to a synonym candidate category that matches the search query category of the search query, wherein the at least one synonym candidate removed from the first group of synonym candidates is not tied to the synonym candidate category, and wherein reformulating the first search query comprises:
dynamically updating the one or more session logs by removing each session log from a database after a preset amount of time;
analyzing the query data of a session log of a plurality of session logs to formulate a plurality of groups of synonym candidates; and
identifying one or more synonym candidates from the plurality of groups of synonym candidates based on at least the search engine performing a first search based on the first search query and the search engine performing a second search based on a second search query within a single session of the plurality of session logs, wherein the first search query was changed to form the second search query during the single session from the plurality of session logs, wherein the first search query and the second search query comprise the feedback data, and wherein the first search query and the second search query are configured to form a synonym candidate pair;

submitting to the search engine the first set of synonyms matching the first search query; and in response to receiving the first search query and further in response to submitting the search engine the first set of synonyms, transmitting search results of the search engine to the user interface of the electronic device of the user.

12. The method of claim 11 further comprising:

while the session remains active, detecting a second interaction between the user and the search engine for a predetermined amount of time after a first interaction between the user and the search engine stops.

13. The method of claim 11, wherein reformulating the first search query further comprises:

searching the one or more session logs for search terms in the query data that match the first search query; and tying the first search query to the search query category, wherein the search query category comprises a product, a service, or the points of interest linked to a particular category path of one or more category paths collected by the one or more processors and stored in the database, wherein the one or more category paths are tied to internet links.

14. The method of claim 11, further comprising:

determining a number of times the synonym candidate pair appears in a group of synonym candidates of the one or more groups of synonym candidates;

when the number of times a particular synonym candidate pair appears in the group of synonym candidates is determined to exceed a predetermined threshold, retaining the particular synonym candidate pair in the group of synonym candidates; or when the number of times the particular synonym candidate pair appears in the group of synonym candidates is determined to fall below the predetermined threshold, removing the particular synonym candidate pair from the group of synonym candidates.

15. The method of claim 11, further comprising:

filtering a particular group of synonym candidates of the one or more groups of synonym candidates by:

tying each synonym candidate of the particular group of synonym candidates to a respective synonym candidate category;

comparing the search query category of a search query with the respective synonym candidate category of each synonym candidate of the particular group of synonym candidates; and removing the synonym candidate from the particular group of synonym candidates to form the first set of synonyms with each synonym in the first set of synonyms being tied to a set category that is common with the search query category of the search query.

16. The method of claim 11, wherein automatically initiating the collection of the query data further comprises:

collecting the query data of each session log of the one or more session logs;

collecting the query data at a predetermined time interval;

collecting the query data in response to a trigger event, wherein the trigger event comprises at least one of:

detecting when each session of the one or more session logs by the user ends; or detecting when the user closes an internet browser; and organizing the query data of each session log of the one or more session logs into the one or more session logs.

17. The method of claim 11, further comprising:

determining each query change of one or more query changes that occurred during a respective session of the one or more session logs.

18. The method of claim 11, further comprising:

filtering a particular group of synonym candidates of the one or more groups of synonym candidates by:

collecting data about the search query category during the session; and determining a frequency of an item being selected having the synonym candidate category that is common with the search query category of a respective search query.

19. The method of claim 11, further comprising:

filtering a particular group of synonym candidates of the one or more groups of synonym candidates by at least one of:

removing the at least one synonym candidate from the particular group of synonym candidates that has a spelling error; or removing the at least one synonym candidate from the particular group of synonym candidates that qualifies as a stemming query of another synonym candidate of the particular group of synonym candidates; or removing the at least one synonym candidate from the particular group of synonym candidates that qualifies as a corner query.

20. The method of claim 11, further comprising:

filtering a particular group of synonym candidates of the one or more groups of synonym candidates by at least one of:

removing the at least one synonym candidate from the particular group of synonym candidates that is mutually non-exclusive from another synonym candidate of the particular group of synonym candidates; or removing the at least one synonym candidate from the particular group of synonym candidates that has an edit distance of three or more characters or letters from another synonym candidate of the particular group of synonym candidates.

* * * * *